United States Patent
Hahn et al.

(10) Patent No.: US 7,786,190 B2
(45) Date of Patent: Aug. 31, 2010

(54) METHOD FOR THE PRODUCTION OF PULVERULENT HIGH-MOLECULAR WATER-SOLUBLE POLYMERS FOR APPLICATION IN SOLID/LIQUID SEPARATION PROCESSES

(75) Inventors: Matthias Hahn, Wilhelmshorst (DE); Antje Lieske, Potsdam (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 108 days.

(21) Appl. No.: 11/917,216

(22) PCT Filed: Jun. 8, 2006

(86) PCT No.: PCT/EP2006/005502
§ 371 (c)(1),
(2), (4) Date: Apr. 2, 2008

(87) PCT Pub. No.: WO2006/133850
PCT Pub. Date: Dec. 21, 2006

(65) Prior Publication Data
US 2008/0234429 A1    Sep. 25, 2008

(30) Foreign Application Priority Data
Jun. 13, 2005  (DE) .................. 10 2005 027 221

(51) Int. Cl.
*C08J 3/00* (2006.01)

(52) U.S. Cl. .................................. 523/340; 525/326.1
(58) Field of Classification Search ................ 523/340; 525/326.1
See application file for complete search history.

(56) References Cited

U.S. PATENT DOCUMENTS

| | | |
|---|---|---|
| 6,710,141 B1 | 3/2004 | Heide et al. |
| 2004/0030039 A1 | 2/2004 | Hund et al. |
| 2006/0111476 A1* | 5/2006 | Farrar et al. .................. 523/332 |
| 2006/0153793 A1 | 7/2006 | Chrisstoffels |

FOREIGN PATENT DOCUMENTS

| | | |
|---|---|---|
| DE | 102 60 100 A1 | 7/2004 |
| DE | 103 31 865 A1 | 3/2005 |
| EP | 1 311 553 A1 | 5/2003 |
| WO | WO 2004/018087 A1 | 3/2004 |
| WO | WO 2004/056896 A1 | 7/2004 |

OTHER PUBLICATIONS

English translation of International Preliminary Report on Patentability from International Patent Application No. PCT/EP2006/005502.

* cited by examiner

*Primary Examiner*—Edward J Cain
(74) *Attorney, Agent, or Firm*—Leydig, Voit & Mayer, Ltd.

(57) ABSTRACT

The present invention relates to a method for the production of pulverulent high-molecular water-soluble polymers for application in solid/liquid separation processes. The invention relates in particular to a method for modifying and drying inverse polymer dispersions with the help of kneading technology while recovering the solvents used.

18 Claims, No Drawings

METHOD FOR THE PRODUCTION OF PULVERULENT HIGH-MOLECULAR WATER-SOLUBLE POLYMERS FOR APPLICATION IN SOLID/LIQUID SEPARATION PROCESSES

The present invention relates to a method for the production of pulverulent high-molecular water-soluble polymers for application in solid/liquid separation processes. The invention relates in particular to a method for modifying and drying inverse polymer dispersions with the help of kneading technology whilst recovering the solvents used.

High-molecular water-soluble cationic polymers play a decisive role in many fields. They are used in the paper industry, in water treatment and waste water purification, in the breaking of emulsions, etc. Polymers of this type can be produced either in solution or with the help of heterophase techniques. Since high molar masses are a prerequisite for optimum efficiency in the mentioned fields and these are scarcely achieved with standard solution polymerisation, polymerisation in inverse emulsion represents the current state of the art. The reaction mixture hereby comprises two phases, an organic continuous and an aqueous dispersed phase in which the monomers and additives are dissolved. At least one emulsifier serves for stabilisation of the inverse emulsion. The resulting polymer dispersions have particle sizes between 200 mm and 10 μm, the active substance content is between 30 and 50%.

The largest part of the described polymers is used directly in dispersion form by the applier of the polymers. This is disadvantageous from various aspects. High transport and storage costs occur since the dispersions contain approx. 50% of non-active components—oil as carrier phase, emulsifiers and water. At the same time, these components can have a negative influence on the application. The oil used which acts as carrier phase is lost during the application. In addition, the storage stability of inverse polymer dispersions is limited.

Hence the use of solid products is more advantageous. Various production methods for solid products of this type are known.

One possibility which is introduced resides in bead polymerisation (suspension polymerisation) of the monomer dissolved in water in a carrier phase, suspensions with particle sizes between 10 and 100 μm being produced. The carrier phase is subsequently separated mechanically and/or by distillation. The polymers obtained with this method have however in general molar masses which are much smaller than those produced in inverse emulsion polymerisations. In EP 1 311 553, the bead polymerisation of diallyldimethyl ammonium chloride (DADMAC) into polymers with molar masses up to 20,000,000 g/mol is described. Such high molecular weights for this polymer cannot be comprehended for kinetic reasons and might be attributed to artifacts during the molar mass determination. For cationic polymers, the data of a molar mass without detailed data for the determination method and the conditions is not meaningful. However a comparable size is IV under defined conditions, which is missing in the mentioned patent. In addition, the method demands at least 67% monomer solution which is not commercially available.

The processing of inverse polymer dispersions into powders by means of spray drying is likewise known. However it is disadvantageous in this method that it barely allows control of the dewatering degree. However this is of crucial importance for the solution properties of the polymer powder. Too intensive dewatering leads to poorly soluble products.

The two methods described above in addition allow no additional modifications of the polymer in the drying step.

WO 2004/018087 describes the modification and drying of water-soluble polymers. According to the above-mentioned WO specification, it is thereby proposed to implement the polymerisation in a kneading reactor and subsequent drying in a special apparatus. It is hereby disadvantageous that this method is very complex and, with respect to the solid pulverulent products, unsatisfactory results with respect to the molecular weight and the water solubility are achieved.

Starting here from it is the object of the present invention to provide a simple and economical method for the production of pulverulent high-molecular water-soluble polymers, which makes it possible in addition to modify inverse dispersions of water-soluble high-molecular cationic polymers for application in solid/liquid separation processes with the aim of enhancing performance. Such modifications are primarily molar mass increase and the specific incorporation of chain branches and also modifications to the functional groups for specific adjustment of the hydrophily.

This object is achieved by the features of patent claim 1. The sub-claims reveal advantageous developments.

With the invention, the generally acknowledged advantages of the polymerisation of water-soluble monomers in inverse emulsion (the achievement of maximum molar masses for a given monomer system) are coupled with the advantages associated with modification of solids.

The method is characterised in that
a) a water-in-oil emulsion which contains at least one polymerisable water-soluble monomer is polymerised in a polymerisation reactor,
b) the polymer dispersion is transferred into a kneading unit and is dried in the kneading unit with the application of increased temperature and vacuum and
c) the carrier phase is recovered.

With reference to feature a), i.e. in the production of the polymer dispersion, it is preferred if the proportion of the water phase to the total emulsion is between 30 and 90% by mass, preferably between 50 and 75% by mass. Furthermore, it has proved to be advantageous if the monomer content of the aqueous phase is between 10 and 90% by mass, preferably between 50 and 70% by mass. The aqueous phase thereby contains preferably monomers which are selected from water-soluble cationic and non-ionic monomers. Examples in this respect are (meth)acrylic acid ester, cationic N-substituted (meth)acrylic acid amides, DADMAC, (meth)acrylamide and corresponding N-substituted derivatives. In addition, the water phase can contain water-soluble multifunctional monomers (cross-linking agents) in proportions of 0 to 5% by mol relative to the monomers. Cross-linking agents of this type are for example bisacrylamides, diacrylates, bisdiallyl compounds and further cross-linking agents known from prior art.

The proportion of the oil phase in the water-in-oil emulsion is, according to the present invention, preferably 10 to 78% by mass, particularly preferred 25 to 50% by mass. From the viewpoint of material, it is advantageous if the oil phase is selected from hydrocarbons or mixtures thereof, in particular from mineral oils, isoparaffin and synthetic oils.

The water-in-oil emulsion according to feature a) contains still 0.5 to 10% by mass of an emulsifier or mixture thereof. Suitable examples here are emulsifiers of the Span or Tween type, polymer emulsifiers and fatty acid amides and further emulsifiers corresponding to the state of the art. The polymerisation is then started by the addition of a radical source (water- or oil-soluble peroxosulphates, azo compounds and redox systems).

It is now essential for the method according to the invention that the polymer dispersion was produced as described previously under a), is transferred into a kneading unit for drying and is dried in the kneading unit applying an elevated temperature and vacuum. It has been shown that in particular the use of kneading technology for the drying step is very favourable. The kneader is thereby then equipped preferably with a vacuum unit and a possibility for gassing with protective gas and a condensation system for distilled-off solvents. As a result of the construction of the kneading units, good thorough mixing and constant renewal of the surface is produced. The increasingly viscous polymer mass is decomposed into small particles, which configures the drying process very effectively. Angle and form of the kneading elements can then be adapted to each special system, i.e. the development, the viscosity in the drying process. A further advantage resides in the fact that the previously described process can be operated both discontinuously and continuously.

During the drying step (method step b)), the temperature and the pressure can be adapted to the solvent to be evaporated and to the desired drying degree. The pressure is thereby between normal pressure and 5 mbar, preferably between 200 and 300 mbar. The temperature is between 20 and 200° C., preferably between 50 and 150° C.

A further advantage of the method according to the invention resides in the fact that the carrier phase is recovered again (feature c)). For this purpose, the evaporated solvents are collected separately and can then be recycled after a possibly required purification.

A substantial advantage of the method according to the invention can now be seen in the fact that not only a simple and hence economical method configuration is present but also that the residual water content which is essential for the dissolution characteristic of the product can be adapted by the choice of the conditions of the method for each system. The obtained product of the drying step is thereby a rapidly and completely water-soluble free-flowing granulate.

A further embodiment of the method according to the invention now resides in the fact that it is possible in addition to subject the polymer dispersion obtained according to method step a) to a reactive processing after transfer into the kneader unit but before drying. For this purpose, the polymer dispersion is transferred into the kneader after reaching a desired conversion which can be between 40 and 100%, as described previously under feature b). During the reactive processing, i.e. before drying, modification- and/or initiator reagents are added to the kneading unit. Examples in this respect are all the initiators which are used according to prior art in the production of water-soluble polymers (azo compounds, peroxosulphates, redox systems etc.), and also cross-linking reagents and reagents which, on the polymer chain, lead to modification reactions, such as esterification, amidation, hydrolysis, neutralisation, saponification etc. The reactive processing can be effected at any pressure, optionally under protective gas and at temperatures between 20 and 150° C., preferably between 40 and 90° C. The advantage of the reactive processing before the drying step in the same kneading unit can be seen in the fact that good thorough mixing of very viscous systems is achieved in association with good self-cleaning.

The application of the method according to the invention leads to pulverulent polymers with characteristics with respect to molar mass, molar mass distribution and chain architecture as cannot be achieved by polymerisation in a conventional reactor.

The subsequent embodiments are intended to clarify this and explain the invention in more detail.

EMBODIMENTS

Example 1

Comparative Example

The inverse emulsion polymerisation of DADMAC in a standard polymerisation reactor is described herein.

| Water phase | Oil phase (35%) |
|---|---|
| 126 g DADMAC 65% in water | 80 g isoparaffin (boiling range: 100 to 140° .C |
| 4 g acrylamide 50% in water | 2 g Span80 |
| 14 g EDTA 1% in water | 2 g Tween85 |
| 1.0 g sodium peroxosulphate | 2 g Hypermer2296 |
|  | 2 g NXS3 |

The individual phases are homogenised by agitation and a water-in-oil emulsion is produced by the addition of the water-to-oil phase with strong shearing (high speed agitator 3,000 rpm). This is transferred into a temperature-controllable double-shell agitator with a gas line and a reflux cooler placed thereon and the batch is rinsed for 30 minutes with $N_2$ with agitation. Subsequently, 100 mg tetramethyl ethylene diamine (TEMED), dissolved in 2 g isoparaffin, are metered in and the batch is heated up to 35° C. After 16 h at 35° C., a further 30 mg TEMED is metered in and heated for 4 h to 50° C. and for a further 4 h to 80° C.

A stable dispersion is produced with complete conversion.

The intrinsic viscosity [η] of the polymer in 1N aqueous NaCl solution at 30° C. was 173 cm³/g, the average molar mass $M_W$ determined by means of GPC-MALLS 860,000 g/mol. These values were determined without a separate drying step.

Example 2

The drying of the polymer dispersion of example 1 in a kneader is described herein.

The polymer dispersion is transferred into a temperature-controllable kneader, equipped with a vacuum unit and the possibility of gassing with protective gas and condensation system for distilled-off solvents. The temperature is firstly set to 50° C., the pressure to 60 mbar. Under these conditions the result is evaporation of an azeotropic mixture of water and isoparaffin. After approx. 60 minutes, the temperature is increased slowly to 80° C. and the pressure is lowered to 30 mbar. The initially still stable and low-viscous dispersion becomes increasingly pasty as a result of evaporation of the oil phase, the result is formation of fairly large particles which are processed towards the end of the drying after approx. 60 minutes at 80° C. by kneading to form a powder.

The intrinsic viscosity [η] of the polymer powder in 1N aqueous NaCl solution at 30° C. was 168 cm³/g, the average molar mass $M_W$ determined by means of GPC-MALLS 830,000 g/mol.

As results therefrom, the average molar mass $M_W$ is of the same order of magnitude as the molar mass $M_W$ according to example 1. This was not predictable since normally a significant influence of the molar mass towards low values is effected by the drying step.

Example 3

The reactive processing and drying of a polymer dispersion in the kneader is described herein.

The operation takes place initially as described in example 1. The polymerisation is however stopped after the 35° C. phase at a conversion of approx. 60% and the emulsion is transferred into the kneader described in example 2. 50 g water are added to the system with kneading. The result is a highly viscous dispersion. Heating takes place under protective gas to 50° C. and 30 mg TEMED in 1 g Isopar and also 100 mg PEG diacrylate in 2 g toluene are metered in. After 4 h at 50° C., heating takes place for 4 h at 80° C.

Subsequently, the dispersion is dried following example 2. In contrast to example 2, the temperature is left at 80° C. and evaporation of the solvent is controlled by progressive lowering of the pressure from 800 mbar within 90 minutes.

The intrinsic viscosity [η] of the polymer powder in 1N aqueous NaCl solution at 30° C. was 232 cm$^3$/g, the average molar mass $M_W$ determined by means of GPC-MALLS 1,520,000 g/mol.

The invention claimed is:

1. A method for the production of pulverulent water-soluble polymers by polymerization of a water-in-oil emulsion and subsequent drying, comprising
   a) polymerizing water-in-oil emulsion which contains at least one polymerizable water-soluble monomer in a polymerization reactor,
   b) transferring the polymer dispersion into a kneading unit and drying in the kneading unit with the application of increased temperature and vacuum and
   c) recovering the carrier phase;
   wherein the polymerization (method step a)) is conducted up to a conversion between 40 and 100% and the thus obtained polymer dispersion is then subjected to a reactive processing in the kneading unit before drying, and wherein modification- and/or initiator reagents are added during the reactive processing in the kneading unit.

2. The method according to claim 1, wherein the proportion of the water phase to the entire emulsion is between 30 and 90% by mass.

3. The method according to claim 1, wherein the monomer content of the aqueous phase is between 10 and 90% by mass.

4. The method according to claim 1, wherein the monomers of the aqueous phase are selected from water-soluble cationic monomers.

5. The method according to claim 4, wherein the aqueous phase further contains non-ionic water-soluble monomers and/or multifunctional water-soluble monomers.

6. The method according to claim 1, wherein the proportion of the oil phase is between 10 and 70% by mass.

7. The method according to claim 6, wherein the oil phase is selected from hydrocarbons or mixtures thereof.

8. The method according to claim 1, wherein the water-in-oil emulsion contains 0.5 to 10% by mass of an emulsifier or mixtures thereof.

9. The method according to claim 1, wherein the water-in-oil emulsion contains polymerization initiators.

10. The method according to claim 1, wherein a twin-screw kneader is utilized as kneading unit.

11. The method according to claim 10, wherein the kneading unit is equipped with a condensation- and/or recycling system.

12. The method according to claim 1, wherein the drying of the polymer dispersion is implemented at pressures between normal pressure and 5 mbar and temperatures between 20 and 200° C.

13. The method according to claim 12, wherein the drying is implemented between 800 and 30 mbar and temperatures between 50 and 150° C.

14. The method according to claim 1, wherein temperatures between 20 and 150° C. are maintained during the reactive processing.

15. The method according to claim 14, wherein the temperatures are in the range 40 to 90° C.

16. The method according to claim 1, wherein the process takes place under protective gas.

17. The method according to claim 6, wherein the oil phase is selected from the group consisting of mineral oils, isoparaffin, and synthetic oils.

18. The method according to claim 2, wherein the monomer content of the aqueous phase is between 10 and 90% by mass.

* * * * *